US007216031B2

(12) United States Patent
Nomura

(10) Patent No.: US 7,216,031 B2
(45) Date of Patent: May 8, 2007

(54) ELECTRONIC CONTROL UNIT FOR VEHICLES

(75) Inventor: Daisuke Nomura, Obu (JP)

(73) Assignee: Denso Corporation, Kariya, Aichi-pref. (JP)

( * ) Notice: Subject to any disclaimer, the term of this patent is extended or adjusted under 35 U.S.C. 154(b) by 170 days.

(21) Appl. No.: 11/108,915

(22) Filed: Apr. 19, 2005

(65) Prior Publication Data

US 2005/0234631 A1 Oct. 20, 2005

(30) Foreign Application Priority Data

Apr. 19, 2004 (JP) ............................ 2004-123359
Mar. 9, 2005 (JP) ............................ 2005-065781

(51) Int. Cl.
*G06F 19/00* (2006.01)
*G06F 7/70* (2006.01)

(52) U.S. Cl. ...................................... 701/114; 701/103

(58) Field of Classification Search ................ 701/114, 701/103; 73/119 R, 118.1; 123/520, 198 D
See application file for complete search history.

(56) References Cited

U.S. PATENT DOCUMENTS 5,200,900 A * 4/1993 Adrain et al. ............... 701/115
5,293,317 A * 3/1994 Adrain et al. ............... 701/115
5,446,665 A * 8/1995 Adrian et al. ............... 701/102
5,523,948 A * 6/1996 Adrain ......................... 701/99
6,175,795 B1 1/2001 Sumida ........................ 701/49
2003/0135309 A1 7/2003 Matsumoto .................. 701/29
2004/0249986 A1* 12/2004 Minowa et al. ................ 710/1

FOREIGN PATENT DOCUMENTS

JP 61-81235 4/1986
JP 4-295162 10/1992
JP 2003-320872 11/2003

* cited by examiner

*Primary Examiner*—John T. Kwon
(74) *Attorney, Agent, or Firm*—Nixon & Vanderhye P.C.

(57) ABSTRACT

An electronic control unit for a vehicle-mounted engine system has a computer and a single program memory. The program memory stores a plurality of functionally finely classified programs, which includes programs to be used in common between a normal engine control mode and a fuel evaporation leak diagnosis mode. The plurality of programs is associated, as a reference table, with the plurality of different control modes by separating programs required for the respective control modes. The computer sequentially executes only programs associated with the designated control mode, when any of the control modes is designated.

22 Claims, 13 Drawing Sheets

FIG. 2A

| | | | | | | | | |
|---|---|---|---|---|---|---|---|---|
| ID | DATA #1 | DATA #2 | DATA #3 | DATA #4 | DATA #5 | DATA #6 | DATA #7 | DATA #8 |

FIG. 2B

| | | | | | | | | |
|---|---|---|---|---|---|---|---|---|
| ID | LEN | SID | MODE | − | − | − | − | − |

FIG. 12A

CHANGE TO DIAGNOSIS MODE

| | | | | | | | | |
|---|---|---|---|---|---|---|---|---|
| 700 | 02 | 01 | 01 | – | – | – | – | – |

FIG. 12B

CHANGE TO NORMAL MODE

| | | | | | | | | |
|---|---|---|---|---|---|---|---|---|
| 700 | 02 | 01 | 00 | – | – | – | – | – |

ELECTRONIC CONTROL UNIT FOR VEHICLES

CROSS REFERENCE TO RELATED APPLICATION

This application is based on and incorporates herein by reference Japanese Patent Applications No. 2004-123359 filed on Apr. 19, 2004 and No. 2005-65781 filed on Mar. 9, 2005.

FIELD OF THE INVENTION

The present invention relates to an electronic control unit. More particularly, the present invention relates to an electronic control unit capable of executing a plurality of different controls including control of operation of a vehicle-mounted engine and control of diagnosis to be performed on a fuel vapor processing system after the engine stops.

BACKGROUND OF THE INVENTION

Vehicle-mounted systems include an engine system having a fuel vapor processing unit. In the engine system, fuel vapor generated in a fuel tank is tentatively collected in a canister without being released to the atmosphere. The collected vapor is purged into an intake passage, and it is combusted in an engine. However, when a fault such as cracking or creation of a hole occurs in, for example, a vapor line or a purge line in the engine system, it is likely that the air tightness of the interior of the processing unit may not be maintained and appropriate processing of fuel vapor is disabled.

Electronic control units are therefore requested to have a capability to diagnose presence or absence of the foregoing fault. However, the internal pressure of a fuel vapor processing system tends to vary during a period in which an engine is in operation or a vehicle is traveling. The foregoing fault cannot be fully diagnosed during that period. Therefore, U.S. Patent No. 2003/0135309 A1 (JP 2003-205798 A) proposes an engine system. In this engine system, after power supply to an electronic control unit is discontinued by the turning off of an ignition switch, the power supply to the electronic control unit is resumed using, a timer in order to perform diagnosis on a fuel vapor processing apparatus.

In the engine system, normal engine control is executed while an engine is in operation and control of diagnosis to be performed on a fuel vapor processing unit is executed after the engine is stopped. The controls are executed mutually independently. Nevertheless, the control structure designed to perform the foregoing diagnosis during execution of a vehicle is employed as it is. An increase in a load of arithmetic operations, which are required for the controls, imposed on the electronic control unit cannot be ignored.

Specifically, in order to effectively utilize a space in an electronic control unit, various programs stored in a single program memory, that is, a sole read only memory (ROM) are selectively executed based on the state of an engine or the state of a vehicle in which the engine is mounted. Thus, the engine control or the control of diagnosis on a fuel vapor processing system is executed. Moreover, programs to be executed in common for the controls are stored in a ROM and used in common. Therefore, the ROM itself is structured to hold, in addition to various programs for executing the two kinds of controls, that is, the normal engine control and the control of diagnosis on a fuel vapor processing system, a mode designation program for determining based on the state of the engine or vehicle whichever of the two controls should be executed for each of the programs.

For execution of the various programs stored in the ROM, the mode designation program is invoked at every time of execution of a program. Consequently, control is executed appropriately according to the state of an engine or a vehicle. However, in practice, the control structure causes a large memory area in the ROM and eventually causes an increase in the load of arithmetic operations on the electronic control unit.

SUMMARY OF THE INVENTION

The present invention has an object to provide an electronic control unit in which even when a plurality of different controls including normal engine control and control of diagnosis on a fuel vapor processing system is executed, a load of arithmetic operations can be reduced appropriately.

An electronic control unit for a vehicle-mounted system according to the present invention has a computer and a single program memory. The program memory stores a plurality of functionally finely classified programs, which includes programs to be used in common among the plurality of modes. The plurality of programs is associated, as a reference table, with the plurality of different control modes by separating programs required for the respective control modes. The computer sequentially executes only programs associated with the designated control mode, when any of the control modes is designated.

The plurality of modes may be an engine control mode performed when an engine is normal and an evaporation leak diagnosis mode performed when the engine is stopped.

BRIEF DESCRIPTION OF THE DRAWINGS

The above and other objects, features and advantages of the present invention will become more apparent from the following detailed description made with reference to the accompanying drawings. In the drawings:

FIG. 2A and FIG. 2B show examples of a data structure adapted to packet data to be transferred between the electronic control unit in accordance with the first embodiment and any other control unit;

FIG. 12A and FIG. 12B show examples of packet data to be transferred between the electronic control unit in accordance with the first embodiment and any other control unit;

DETAILED DESCRIPTION OF THE PREFERRED EMBODIMENTS

First Embodiment

Figure 1:
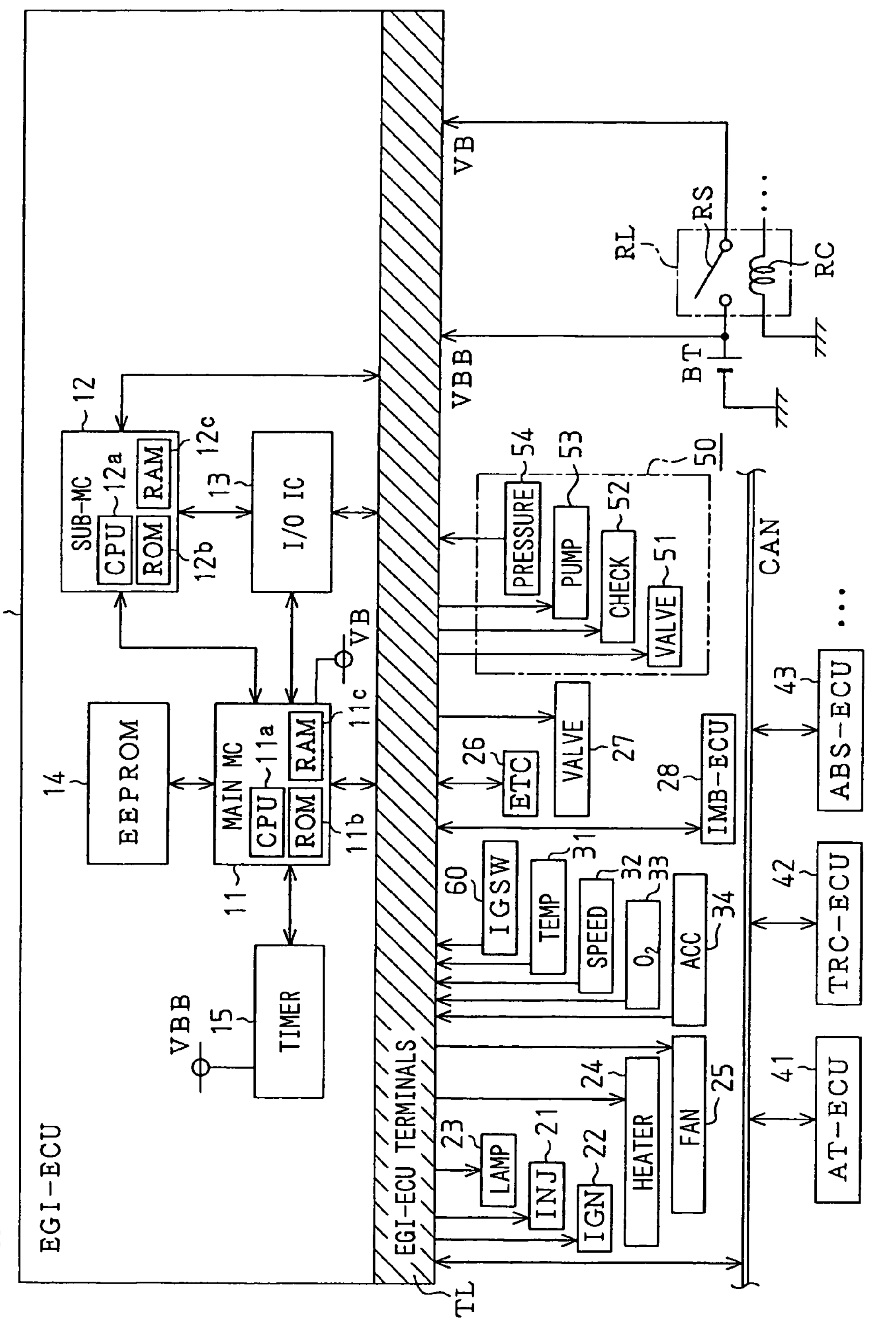
FIG. 1 illustratively shows in a block diagram a first embodiment of an electronic control unit in accordance with the present invention.

Referring to FIG. 1, an electronic control unit (EGI-ECU) 10 for electronically-controlled gasoline injection (EGI) is constructed with a main microcomputer (MC) 11, a sub-microcomputer 12, an input/output IC 13, an electrically erasable programmable ROM (EEPROM) 14, and a timer 15. The main microcomputer (main controller) 11 and sub-microcomputer (sub-controller) 12 each include a central processing unit (CPU) 11*a*, 12*a*, a read-only memory (ROM) 11*b*, 12*b*, and a random access memory (RAM) 11*c*, 12*c*. The ROM 11*b* and 12*b* are used mainly as program memories. A normal engine control program, a diagnosis program for performing diagnosis on a fuel vapor processing system, and a control program for controlling driving of the sub-microcomputer 12, which are executed by the CPU 11*a*, are stored in the ROM 11*b*. A control program for controlling an electronically-controlled throttle valve (ETC) which is executed by the CPU 12*a* is stored in the ROM 12*b*. Moreover, the RAMs 11*c* and 12*c* are data memories in which data being handled in order to perform arithmetic operations and the results of arithmetic operations are temporarily stored.

Moreover, a vehicle-mounted battery BT serving as a power source is electrically connected to the electronic control unit 10 with or without an electromagnetic relay RL, which is composed of a relay switch RS and a relay coil RC, between them. That is, backup power (VBB) that must be fed to the timer 15 is always supplied to the electronic control unit 10 without the electromagnetic relay RL between them. On the other hand, power (VB) that must be fed via the electromagnetic relay RL is supplied to the electronic control unit 10 when the relay switch RS is made after the relay coil RC becomes conducting in response to a conduction signal sent from an ignition switch (IGSW) 60 that is an engine start switch, the main microcomputer 11 or the timer 15.

The electronic control unit 10 includes an OR circuit that detects the conduction signal, though the OR circuit is not shown. When the conduction signal sent from any of the ignition switch, main microcomputer and timer is detected, the relay coil RC becomes conducting or is kept conducting. The power VB is supplied to, for example, the main microcomputer 11. Specifically, the power VB or VBB supplied to the electronic control unit 10, that is, a supply voltage (normally, 14 V) developed at the vehicle-mounted battery BT is regulated into an operating voltage (for example, 5 V) by a power circuit (not shown) included in the electronic control unit 10, and then supplied to the components of the electronic control unit 10.

Moreover, external devices including an injector (INJ) 21, an igniter (IGN) 22, a warning lamp 23, an $O_2$ sensor heater 24, a radiator fan 25, an electronically-controlled throttle valve (ETC) 26, a boost pressure valve 27, an immobilizer control unit (IMB-ECU) 28, a switching valve 51, a check valve 52, and a vacuum pump 53 are connected to the electronic control unit 10 via a terminal TL.

Furthermore, various sensors including a temperature sensor 31, a vehicle speed sensor 32, an $O_2$ sensor (air-to-fuel ratio sensor) 33, an accelerator sensor 34, and a pressure sensor 54 are connected to the electronic control unit via the terminal TL. The temperature sensor 31 detects the temperature of coolant for cooling an engine.

Furthermore, the electronic control unit 10 is connected to an intra-vehicle LAN constructed with, for example, a controller area network (CAN) via the terminal TL. Over the intra-vehicle LAN, the electronic control unit 10 can cooperate with numerous other electronic control units including an automatic transmission (AT) control unit 41, a traction (TRC) control unit 42, an antilock brake system (ABS) control unit 43 by utilizing the multiplexing technique. Among the electronic control units including the electronic control unit 10, data divided in units of a packet is transferred. FIG. 2A and FIG. 2B show examples of a data structure adapted to packet data to be transferred.

As shown in FIG. 2A, the packet data includes eight data items DATA#1 to DATA#8 to which an ID (identification information) indicating a destination is appended as a header. In the examples, as shown in FIG. 2B, among the eight data items, only three data items DATA#1 to DATA#3 are employed. The data DATA#1 represents a data length, the data DATA#2 represents a system ID equivalent to a processing item, and the data DATA#3 represents a set value determined for the processing item.

Herein, the electronic control unit 10 shown in FIG. 1, that is, the electronic control unit 10 is an engine control unit (EGI-ECU) for controlling the operation of the vehicle-mounted engine. In the electronic control unit 10, the main microcomputer 11 transfers data to or from the sub-microcomputer 12 so as to execute various vehicle controls including normal engine control. Moreover, the sub-microcomputer 12 executes, among controls of the operation of the vehicle-mounted engine, control of driving of an external device located around the engine, for example, the electronically-controlled throttle valve 26.

Moreover, in the electronic control unit 10, the input/output IC 13 transmits an output of the main microcomputer 11 or sub-microcomputer 12 via the terminal TL or receives an external signal via the terminal TL and transfers the signal to each of the microcomputers. A wave-shaping circuit, a multiplexer, an analog-to-digital converter are included in the input stage of the input/output IC 13. Driver circuits for driving various actuators are included in the output stage of the input/output IC 13. Moreover, the EEPROM 14 is realized with a nonvolatile memory for use in, for example, backing up data.

When power supply to the electronic control unit 10 is discontinued responsively to the turning off of the ignition switch 60 that is an engine start switch, various pieces of control information required for starting the engine next time are backed up in the EEPROM 14 immediately preceding the power supply stop, so that the control information may be used when the engine is started next time. After the power supply to the electronic control unit 10 is discontinued responsively to the driver's turning off of the ignition switch 60, the timer 15 is used to automatically resume the power supply to the electronic control unit 10 in order to perform the aforesaid diagnosis on the fuel vapor processing system in a predetermined set time.

On the other hand, among the aforesaid external devices, the injector 21 serves as an intake port or a fuel injection valve through which fuel is injected into the cylinder of the engine. The igniter 22 is an ignition device for igniting an air-fuel mixture in the cylinder of the engine. The warning lamp 23 is used to notify a driver or the like of an abnormality occurring in the external devices. Moreover, the $O_2$ sensor heater 24 is a heater for heating the $O_2$ sensor 33 so as to facilitate activation of the $O_2$ sensor 33 in the initial stage of starting of the engine. The radiator fan 25 is driven in order to improve the heat radiation efficiency of a radiator when, for example, a vehicle is at a halt or execution at a low speed.

The boost pressure valve 27 is included in a supercharger for the engine in order to regulate a boost pressure. Moreover, the immobilizer control unit 28 prevents robbery of a vehicle. Namely, every time the engine is started, the immobilizer control unit 28 checks a vehicle-inherent code, which is read from a transponder (not shown) incorporated in the ignition switch 60, to determine whether the vehicle-inherent code agrees with an own security code. When the codes disagree with each other, the immobilizer control unit 28 instructs the electronic control unit 10 to cease fuel injection or ignition and thus disables the operation of the engine. Consequently, the start of the engine is enabled with a higher security level attained.

Figure 3A:
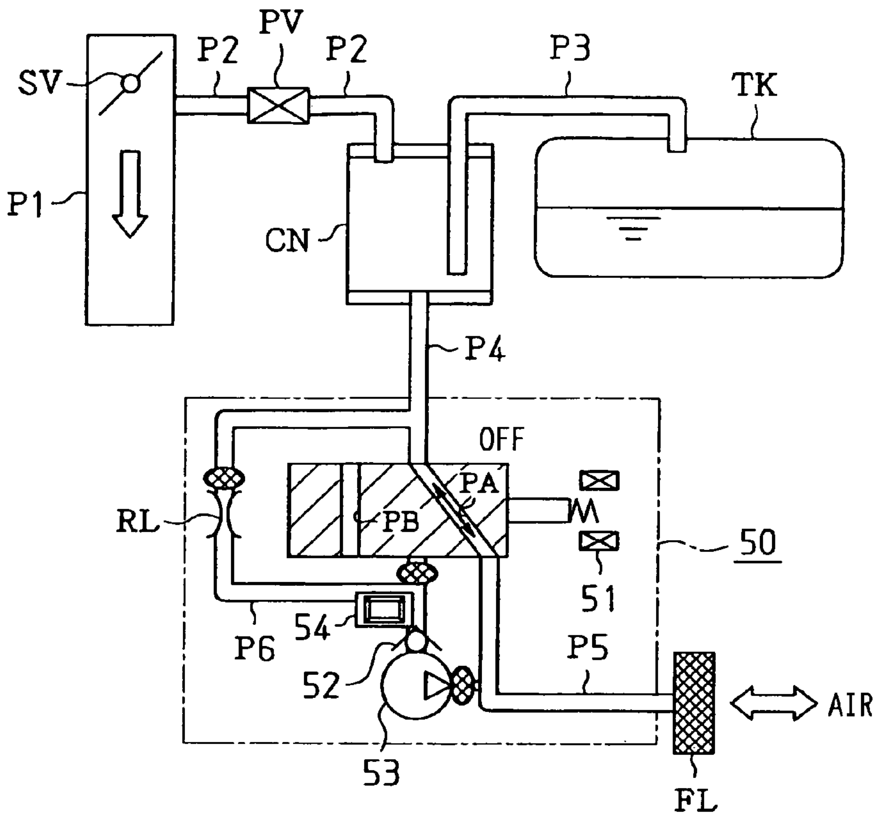
FIG. 3A and FIG. 3B illustratively show in a block diagram a diagnosis apparatus for performing diagnosis on a fuel vapor processing system which is controlled via the electronic control unit in accordance with the first embodiment.
Figure 3B:
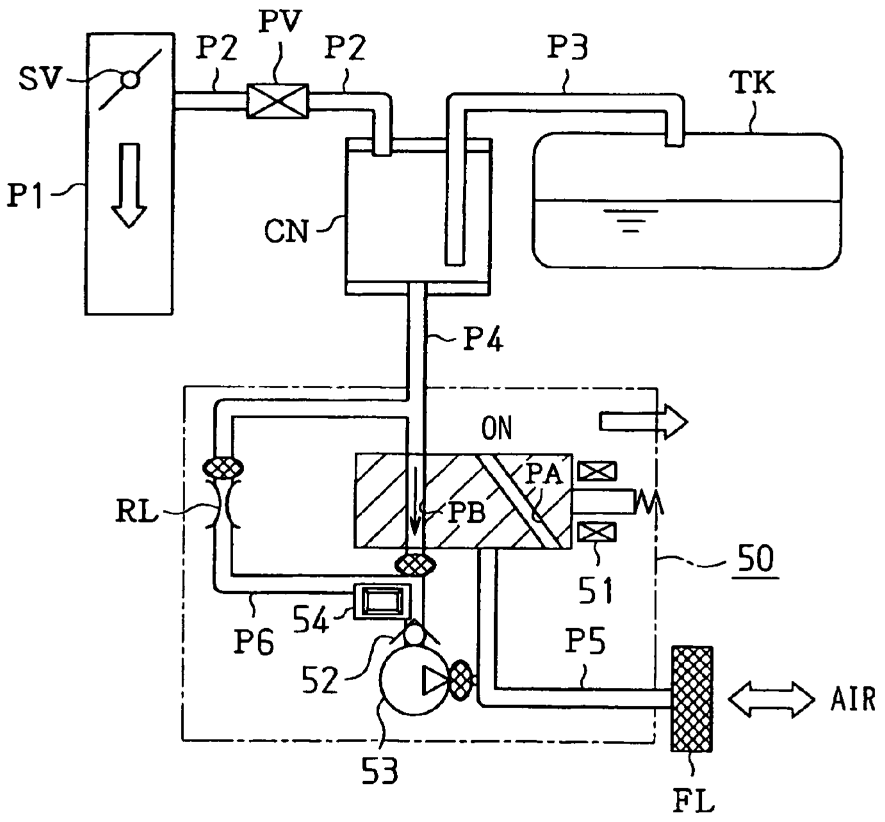

On the other hand, the switching valve 51, check valve 52, vacuum pump 53, and pressure sensor 54 are included in a pump module 50 serving as part of a diagnosis apparatus for performing diagnosis on a fuel vapor processing system shown in FIG. 3A and FIG. 3B, and manipulated or referenced at the time of performing diagnosis on the fuel vapor processing system.

Next, the diagnosis apparatus for performing diagnosis on the fuel vapor processing system controlled by the electronic control unit 10 will be described. FIG. 3A and FIG. 3B show two states into which the diagnosis apparatus for the fuel vapor processing system is brought at the time of performing diagnosis, or more particularly, diagnosing leakage of fuel vapor. In FIG. 3A and FIG. 3B, the same reference numerals are assigned to components identical to those shown in FIG. 1.

The diagnosis apparatus includes a fuel tank TK in which fuel is preserved, a canister CN in which fuel vapor generated in the fuel tank TK is collected, and the pump module 50. Herein, an intake passage P1 leading to the engine, the canister CN and the fuel tank TK are interlinked with pipes P2 and P3. A purge valve PV is provided in the pipe P2. When the purge valve PV is opened, the canister CN communicates with the intake passage P1, which leads to the engine, downstream of the throttle valve SV at which a vacuum pressure is developed. The pipe P3 links the fuel tank TK and canister CN.

The diagnosis apparatus includes the pump module 50 that is controlled by the electronic control unit 10. The pump module 50 and canister CN are linked by a pipe P4. Fuel vapor generated in the fuel tank TK is processed or diagnosis is performed on the fuel vapor processing system.

The pump module 50 includes a switching valve 51. The switching valve 51 selectively allows the pipes P4 and P5 or the pipes P4 and P6 to communicate with each other. Specifically, when the switching valve 51 is non-conducting, the pipes P4 and P5 communicate with each other by way of a switching passage PA as shown in FIG. 3A. On the other hand, when the switching valve 51 becomes conducting, the pipes P4 and P6 communicate with each other by way of a switching passage PB as shown in FIG. 3B.

The pipe P6 includes the check valve (non-return valve) 52 for preventing flow of air into the canister CN, the vacuum pump 53 that sucks air from the canister CN, and the pressure sensor 54 that detects the pressure in the pipe P6 while being located upstream of the vacuum pump 53. The check valve 52 is opened with the air sucked by the vacuum pump 53. The pipe P6 is joined to the pipe P4 by way of a pipe fitting Rh. On the other hand, one end of the pipe P5 is opened onto the air via a filter FL. The air sucked by the vacuum pump 53 is also released to the air by way of the pipe P5 via the filter FL.

Referring to FIG. 4 to FIG. 12B, modes in which various vehicle controls are executed by the electronic control unit 10 will be described. More particularly, modes for executing control of the operation of the vehicle-mounted engine and control of diagnosis to be automatically performed on the fuel vapor processing system after the engine is stopped will be described below.

In the vehicle-mounted engine system, the electronic control unit 10 selectively execute the plurality of programs stored in the ROM 11*b* (FIG. 1) according to which one of the control mode for executing control of the operation of the vehicle-mounted engine and the control mode for executing control of diagnosis of the fuel vapor processing system is designated. Thus, the electronic control unit 10 performs processing associated with the designated control mode. Specifically, the plurality of programs is functionally finely classified and associated in advance with the two control modes by selecting programs required for the respective control modes. The programs are compositely stored in the ROM 11*b*. When either of the control modes is designated, the programs associated with the designated control mode are sequentially called to be executed.

Figure 4:
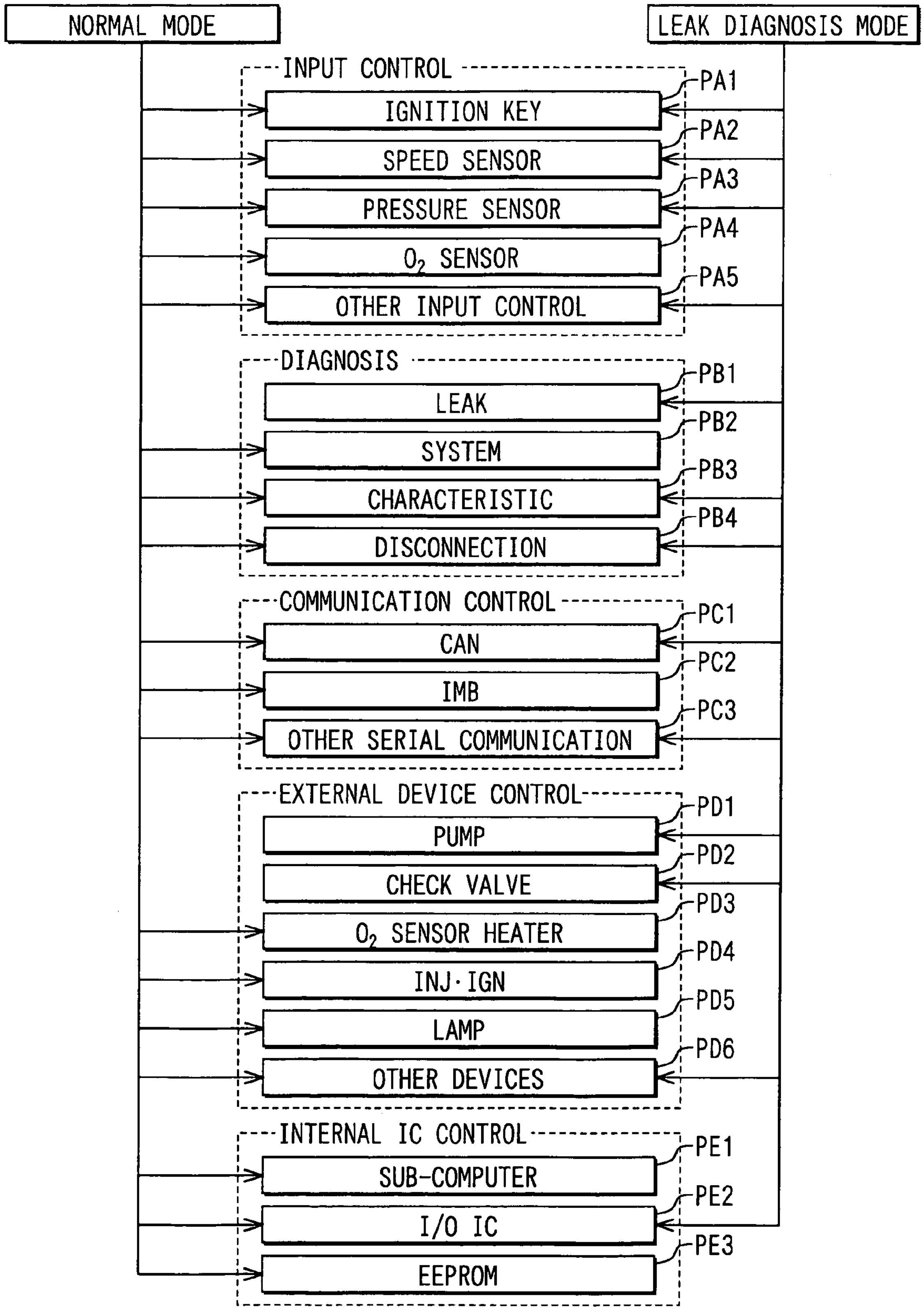
FIG. 4 illustratively shows associations presented by a reference table which the electronic control unit in accordance with the first embodiment references when executing programs.

Moreover, the control modes are associated with the plurality of programs by referencing a reference table (call information table) in which information on links of the control modes with programs required for the respective control modes is written as illustratively shown in FIG. 4. The table is also stored in, for example, the ROM 11*b*. Herein, the control mode (first control mode) for executing control of the operation of the vehicle-mounted engine shall be discriminated from the control mode (second control mode) for executing control of diagnosis on the fuel vapor processing system by calling the first control mode a normal mode and the second control mode a leakage diagnosis mode.

As shown in FIG. 4, information on links with the programs stored in the ROM 11*b*, for example, input control programs PA1 to PA5, diagnosis programs PB1 to PB4, communication control programs PC1 to PC3, external device control programs PD1 to PD6, and internal IC control programs PE1 to PE3 are written in the reference table.

Specifically, for example, the input control programs PA1 to PA5, diagnosis programs PB2 to PB4, communication control programs PC1 to PC3, external device control programs PD3 to PD6, and internal IC control programs PE1 to PE3 are distinguished and associated with the normal mode. Programs not needed in the control mode, for example, a program relevant to diagnosis (leakage diagnosis) on the fuel vapor processing system, that is, the diagnosis program PB1, and the external device control programs PD1 and PD2 are not executed.

On the other hand, the input control programs PA1 to PA3 and PA5, the diagnosis programs PB1, PB3 and PB4, the communication control programs PC1 and PC3, the external device control programs PD1, PD2 and PD6, and the internal IC control program PE2 are distinguished and associated with the leakage diagnosis mode. Consequently, programs not needed in the leakage diagnosis mode are not executed. Namely, the programs presented below are not executed in the leakage diagnosis mode:

the input control program PA4 for controlling an air-to-fuel ratio;

the diagnosis program PB2 for performing diagnosis on a control system (system diagnosis);

the communication control program PC2 for performing processing relevant to control of an immobilizer (IMB) that prevents robbery of the vehicle (especially, communication with the immobilizer control unit 28);

the external device control program PD4 for controlling fuel injection (especially, driving of the injector (INJ) 21) and controlling ignition (especially, driving of the igniter (IGN) 22);

the internal IC control program PE1 for performing processing relevant to control of an intake air quantity; and the external device control program PD3 for controlling driving of the $O_2$ sensor heater 24.

Since the reference table is employed, the control modes can be readily associated with the plurality of programs.

Figure 5:
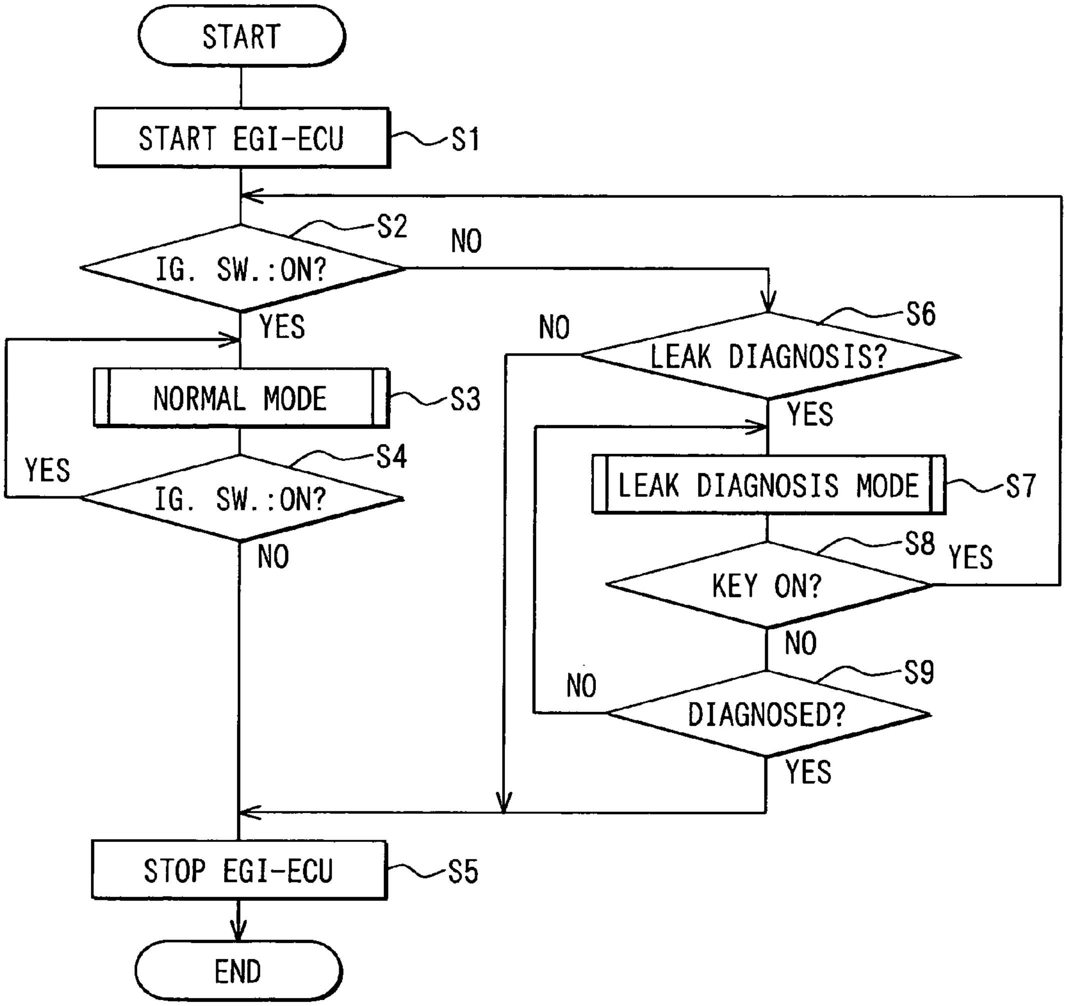
FIG. 5 shows a procedure of mode designation for designating either a control mode for executing normal engine control or a control mode for executing control of diagnosis on a fuel vapor processing system.

Next, referring to FIG. 5 to FIG. 7, execution of the controls will be described below. FIG. 5 is a flowchart according to which the electronic control unit 10 designates either of the control modes and executes control in the designated control mode. The processing is performed in cooperation with the programs stored in, for example, the ROM 11*b*.

In the series of steps, first, the electronic control unit 10 starts its processing at step S1. At step S2, it is determined how the electronic control unit 10 is started. Specifically, it is determined whether the electronic control unit 10 is started responsively to the turning on of the ignition switch (start switch) 60 or in response to a start command sent from the timer 15 after turning off of the ignition switch 60 (engine stop). When the electronic control unit 10 is determined to be started responsively to the turning on of the ignition switch 60, normal control of the operation of the vehicle-mounted engine is considered to be executed. The control is executed in the normal control mode at step S3. In this case, at step S4, the ignition switch 60 is checked if it is turned on. When the ignition switch 60 is determined to be turned off, the electronic control unit 10 is stopped at step S5.

On the other hand, when the electronic control unit 10 is determined at step S2 to be started for any reason other than that the ignition switch 60 is turned on, whether the electronic control unit 10 is started in response to the start command sent from the timer 15 is determined at step S6. When the electronic control unit 10 is determined to be started in response to the start command sent from the timer 15, control of diagnosis on the fuel vapor processing system is considered to be executed. The control is then executed in the leakage diagnosis mode at step S7. Even in this case, at step S8, the ignition switch 60 is checked if it is turned on. When the ignition switch 60 is determined to be turned on, the processing returns to step S2. It is determined again why the electronic control unit 10 is started. When completion of diagnosis is determined at step S9, the electronic control unit 10 is automatically stopped.

On the other hand, when the electronic control unit 10 is determined at step S6 not to be started in response to the start command sent from the timer 15, the electronic control unit 10 is immediately stopped as a fail-safe operation.

In the electronic control unit 10, when the ignition switch 60 is turned on in the leakage diagnosis mode, the leakage diagnosis mode is changed to the normal mode. In the normal mode, as long as the electronic control unit 10 is restarted, the normal mode is not changed to the leakage diagnosis mode.

A history of manipulations performed on the ignition switch 60 is checked as described above to determine why the electronic control unit 10 is started. Thus, either of the control modes is designated, that is, which of the normal mode and leakage diagnosis mode should be executed is determined. Namely, since the normal mode and leakage diagnosis mode should be executed during different periods that do not overlap, the programs associated with a designated control mode are smoothly sequentially executed. In this case, designation of either of the control modes, that is, the mode designation need be performed only once at the time of starting the electronic control unit 10. Even from this viewpoint, a load of arithmetic operations imposed on the electronic control unit is largely reduced.

Moreover, whichever of the control mode (normal mode) for executing control of the operation of the vehicle-mounted engine or the control mode (leakage diagnosis mode) for performing diagnosis on the fuel vapor processing system is designated, the number of programs associated with the designated control mode is enormous. However, those programs can basically be utilized as they are.

Next, referring to both FIG. 6 and FIG. 7, the normal engine control and the control of diagnosis on the fuel vapor processing system (leakage diagnosis) will be described below.

Figure 6:
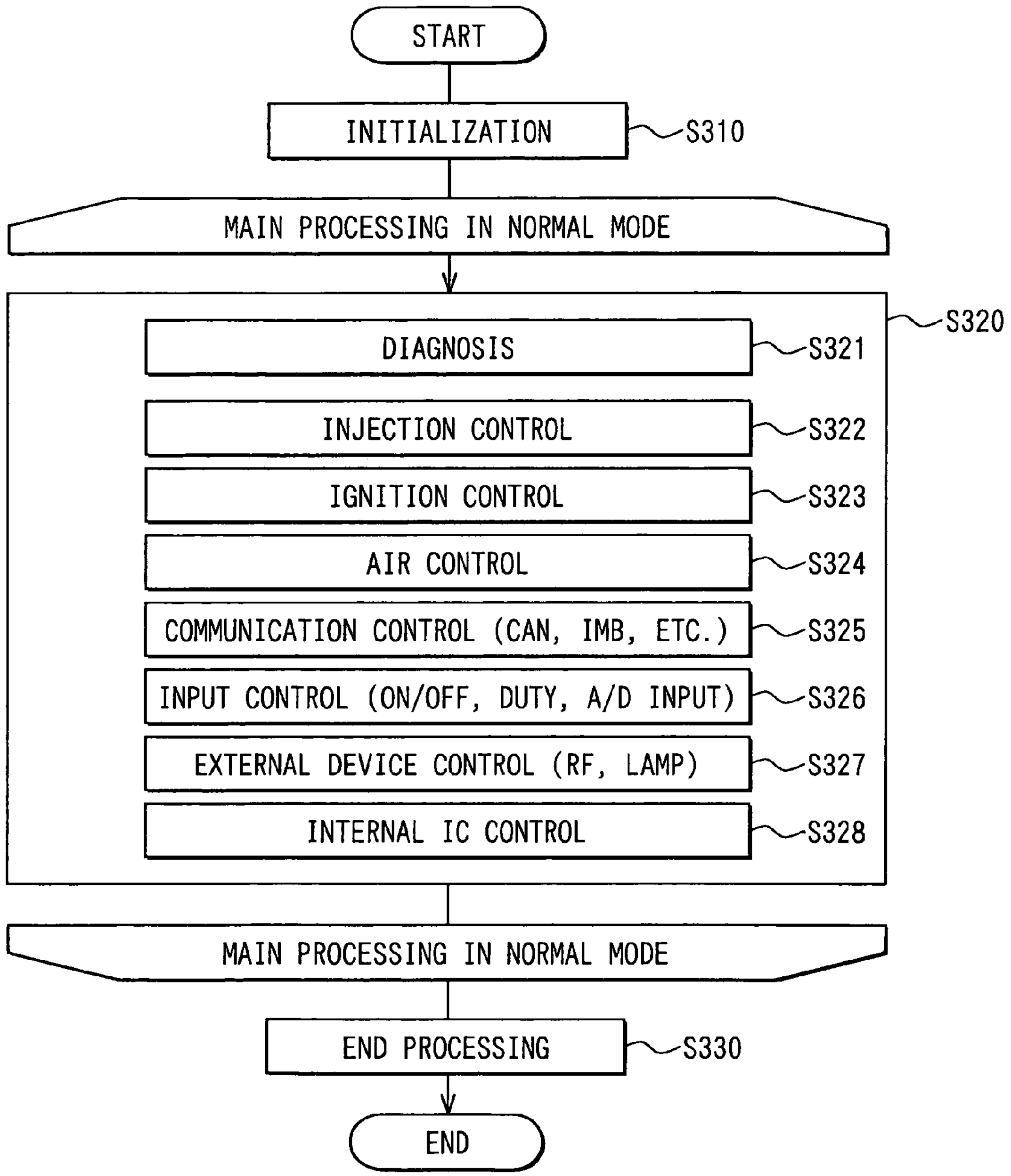
FIG. 6 shows mainly the contents of processing relevant to normal engine control which is performed by the electronic control unit in accordance with the first embodiment.

FIG. 6 is a flowchart showing the processing of step S3 in FIG. 5, that is, processing relevant to the normal control of the operation of the vehicle-mounted engine. As shown in FIG. 6, during the processing relevant to the control of the operation of the vehicle-mounted engine, initialization is first performed at step S310. Thereafter, main processing (S320) in the normal mode is executed. Specifically, the CPU 11*a* selectively executes various programs stored in the ROM 11*b* according to the reference table shown in FIG. 4, and thus actually executes the engine control and vehicle control.

For example, when the diagnosis programs PB2 to PB4 (FIG. 4) are executed, various kinds of diagnosis (system diagnosis, abnormal characteristic detection, break detection, etc.) are performed at step S321. Moreover, when the external device control programs PD3 and PD4 (FIG. 4) are executed, fuel injection control, ignition control, and air quantity control are executed at steps S322 to S324. When various communication controls (communication with the immobilizer, communication over the CAN, or any other serial communication) are executed at step S325, the communication control programs PC1 to PC3 (FIG. 4) are executed. On the other hand, input processing of step S326 is performed by execution of the input control programs PA1 to PA5 (FIG. 4). Moreover, at step S327, the external device control programs PD5 and PD6 (FIG. 4) are executed in order to execute control of various external devices.

At step S328, the internal IC control programs PE1 to PE3 (FIG. 4) are executed in order to execute various controls required between ICs (integrated circuits) incorporated in the electronic control unit 10, for example, the sub-microcomputer 12 and the input/output IC 13 or EEPROM 14.

After these controls are executed, appropriate termination is executed at step S330. Thus, the series of steps is terminated.

Figure 7:
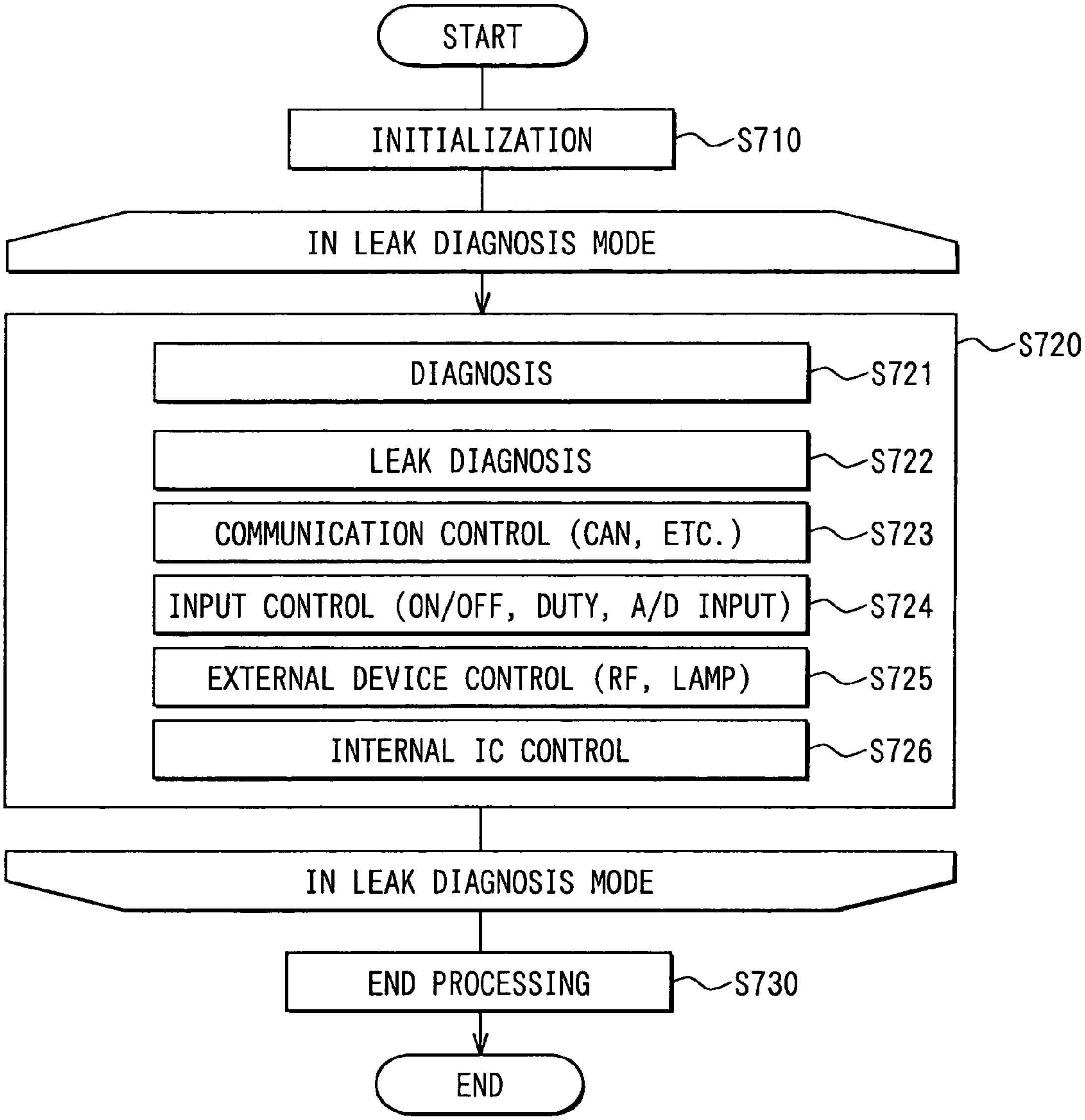
FIG. 7 shows mainly the contents of processing relevant to diagnosis on a fuel vapor processing system which is performed by the electronic control unit in accordance with the first embodiment.

FIG. 7 is a flowchart showing the processing of step S7 shown in FIG. 5, that is, processing relevant to diagnosis (leakage diagnosis) on the fuel vapor processing system. As shown in FIG. 7, even during the processing relevant to diagnosis on the fuel vapor processing system, appropriate initialization is first performed at step S710. Thereafter, at step S720, the CPU 11*a* selectively executes the programs stored in the ROM 11*b* according to the reference table shown in FIG. 4, and thus executes control of the actual diagnosis.

For example, when the diagnosis programs PB3 and PB4 (FIG. 4) are executed, various kinds of diagnosis (abnormal characteristic detection, break detection, etc.) are performed at step S721. At step S722, the diagnosis program PB2 and external device control programs PD1 and PD2 (FIG. 4) are executed in order to perform the fuel vapor leakage diagnosis. At step S723, the communication control programs PC1 to PC3 (FIG. 4) are executed in order to execute various communication controls (CAN control and other serial communication control). When the input processing is executed at step S724, the input control programs PA1 to PA3 and PA5 (FIG. 4) are executed. At step S725, the external device control programs PD5 and PD6 (FIG. 4) are executed in order to execute control of various external devices. At step S726, the internal IC control program PE2 (FIG. 4) is executed in order to execute controls required for the input/output IC 13 incorporated in the electronic control unit 10.

The leakage diagnosis mode is automatically executed after the operation of the engine is stopped. Although the engine is stopped, when the fuel injection control, ignition control or air quantity control is executed, a signal that does not match the current situation may be transmitted or received to cause erroneous diagnosis and other drawbacks. For example, when the sub-microcomputer 12 dedicated to the control of opening of the electronically-controlled throttle valve 26 does not execute the control with the engine stopped, a load condition may vary at the time of starting the engine.

In the electronic control unit 10, the control program for controlling driving of the sub-microcomputer 12 as well as the control programs for executing the fuel injection control, ignition control and air quantity control are not executed in the leakage diagnosis mode. Likewise, driving of the sub-microcomputer 12 and driving of the external devices relevant to the controls, for example, the injector 21 and igniter 22, or the $O_2$ sensor heater 24 and radiator fan 25 will not be carried out. Consequently, the erroneous diagnosis and other various drawbacks can be prevented.

In order to initiate the leakage diagnosis, the boost pressure valve 27 is forcibly closed and other preparations are made. After the control of diagnosis (leakage diagnosis) on the fuel vapor processing system is executed, when abnormality is detected at step S730, this result is written in the EEPROM 14 and other appropriate termination is executed. Thereafter, power supply to the electronic control unit 10 is automatically ceased.

Figure 8:
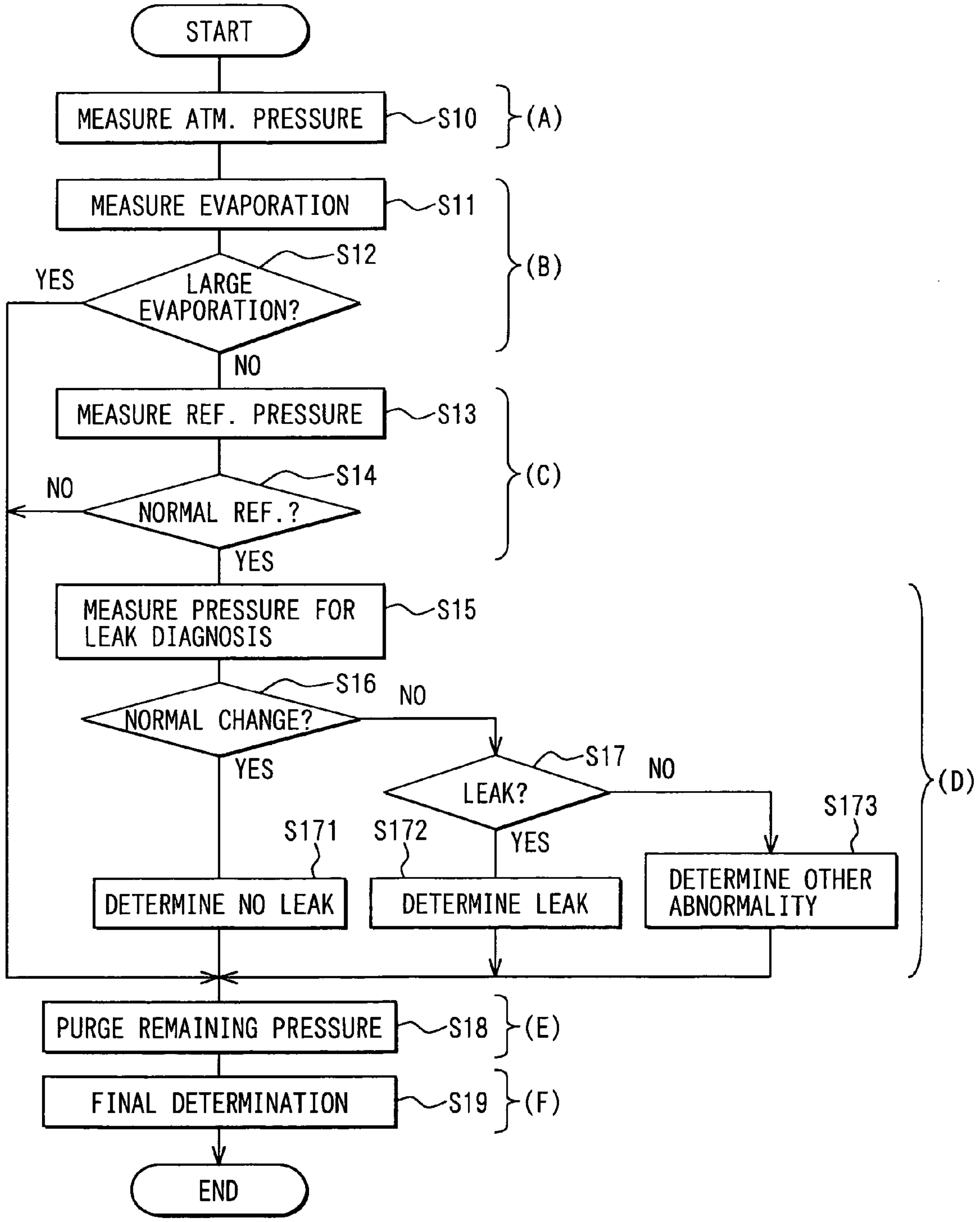
FIG. 8 shows a sequence of processing relevant to diagnosis on a fuel vapor processing system which is performed by the electronic control unit in accordance with the first embodiment.
Figure 9:
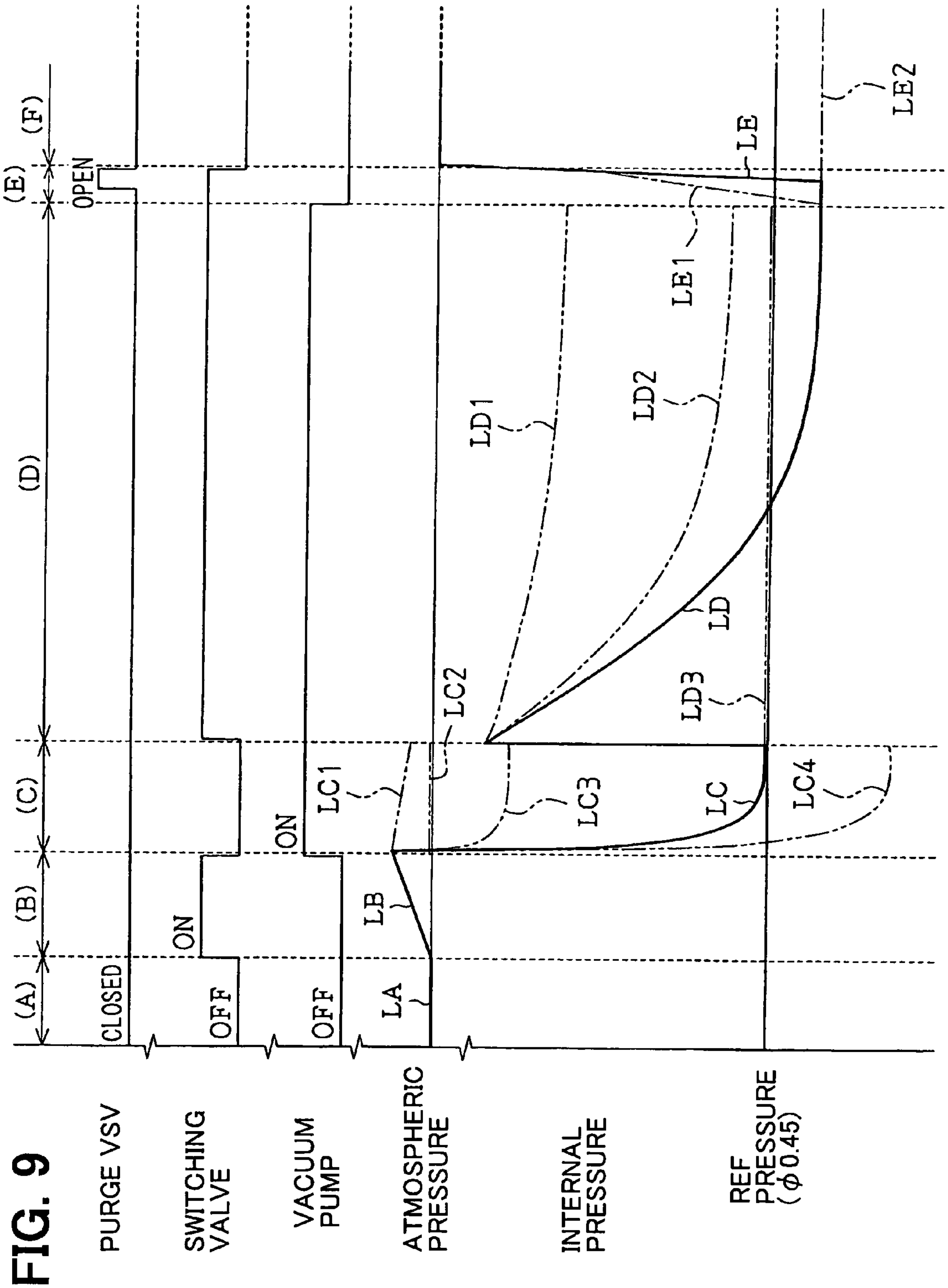
FIG. 9 shows a mode for performing the processing relevant to diagnosis.

FIG. 8 shows a sequence of processing relevant to the diagnosis on the fuel vapor processing system, and FIG. 9 shows a mode for performing the processing. The electronic control unit 10 controls the pump module 50 that serves as part of the diagnosis apparatus for performing the diagnosis on the fuel vapor processing system shown in FIGS. 3A and 3B and that includes the switching valve 51 and vacuum pump 53.

Here, preconditions for the diagnosis processing are listed below:

(a) the electronic control unit 10 is started based on the timer 15;

(b) a history of executions is preserved;

(c) a battery voltage falls within a guaranteed range;

(d) an engine speed (NE) falls below a predetermined value; and (e) a pressure in the tank TK falls within a predetermined range (for example, from 70 kPa to 110 kPa).

When any of the preconditions is not met, the processing is suspended.

In the processing relevant to the diagnosis to be performed on the fuel vapor processing system, first, during a period (A) in FIG. 8, the atmospheric pressure is measured as a base pressure at step S10. The pressure is shown with a characteristic line LA within the period (A) in FIG. 9. As for the state of the diagnosis apparatus at this time, the diagnosis apparatus is brought to the state shown in FIG. 3A. Specifically, during the period A shown in FIG. 9, the purge valve PV is closed, the vacuum pump 53 is turned off (stopped), and the switching valve 51 is non-conducting.

During a period (B) in FIG. 8, at step S11, an amount of fuel vapor generated in the fuel tank TK is measured. Specifically, the switching valve 51 becomes conducting so that the diagnosis apparatus is brought to the state shown in FIG. 3B. In this state, that is, in the state in which the pipe P4 lying on the side of the fuel tank TK and the pipe P6 communicate with each other, the pressure in the pipe P6, that is, the amount of generated fuel vapor is measured using the pressure sensor 54. This pressure is shown with a characteristic line LB in FIG. 9. At step S12, when the value measured at step S11 is determined to be too large (abnormal), the leakage diagnosis is suspended.

On the other hand, when the measured value is determined to be normal at step S11, a reference pressure is measured at step S13 during a period (C) in FIG. 8. Specifically, the diagnosis apparatus is restored to the state shown in FIG. 3A, and the vacuum pump 53 is driven in this state. When a pressure detected sequentially using the pressure sensor 54 saturates, the pressure value is regarded as the reference pressure. This pressure is shown with a characteristic line LC in FIG. 9. At step S14, the measured value is checked to determine whether it is normal relative to the atmospheric pressure. When the pressure is detected as indicated with any of characteristic lines LC1 to LC4 within the period (C) in FIG. 9, a basic hole bored in the switching valve 51, check valve 52, vacuum pump 53 or pipe fitting Rh is estimated to be abnormal.

When the measured value is determined to be normal, a pressure is measured for leakage diagnosis at step S15 performed during a period (D) in FIG. 8. Specifically, the diagnosis apparatus is brought to the state shown in FIG. 3B, again. In this state, the pressure is detected using the pressure sensor 54. At step S16, the measured value is checked to determine whether it is normal. When the measured pressure is determined at step S15 to fall below the reference pressure measured previously at step S13, the measured value is determined at step S171 to be normal (no leakage). This is shown with a characteristic line LD within the period (D) in FIG. 9.

On the other hand, when the measured value is determined to be abnormal, whether the abnormal value results from leakage is determined at step S17. For example, when a pressure that does not reach the reference pressure as indicated with the characteristic line LD1 or LD2 in FIG. 9 (a variation of a pressure) is detected, occurrence of leakage is determined at step S172. On the other hand, when a rise of a pressure is, as indicated with a characteristic line LD3 in FIG. 9, not detected during driving of the switching valve 51, presence of an abnormality in the switching valve 51 (for example, the switching valve is held in the OFF state) is inferred. In this case, an abnormality other than leakage is determined at step S173.

When the leakage diagnosis is completed, remaining pressure is purged at step S18 during a period (E) in FIG. 8. Specifically, after the vacuum pump 53 is stopped, a pressure is checked using the pressure sensor 54 to determine whether it is held unchanged. The purge valve PV is then opened. At this time, when the pressure is equal to the base pressure measured at step S10, the purge valve PV is determined to be normal. This pressure is shown with a characteristic line LE within a period (E) in FIG. 9.

On the other hand, after the vacuum pump 53 is stopped, when the pressure is, as indicated with a characteristic line LE1 in FIG. 9, not held unchanged, the abnormality of the check valve 52 (for example, the check valve 52 is kept open) is estimated. For example, when the purge valve PV is opened, and pressure is not released, the abnormality of the purge valve PV (for example, the purge valve PV is held closed) is estimated.

After the atmospheric pressure is checked at step S18, finalization is executed at step S19 performed during a period (F) in FIG. 8. Specifically, when an abnormality code is produced, the abnormality code is stored in the EEPROM 14. That is, when occurrence of an abnormality is determined at step S12 or step S14 or when an abnormality is detected at step S172 or step S173, an associated specific abnormality code is stored in the EEPROM 14.

Even in the leakage diagnosis mode, in addition to erroneous diagnosis or a drawback attributable to the engine control program, erroneous diagnosis or a drawback may occur due to communication with any other control unit, which is connected to the electronic control unit 10 over a communication line so that it can communicate with the electronic control unit 10.

Figure 10:
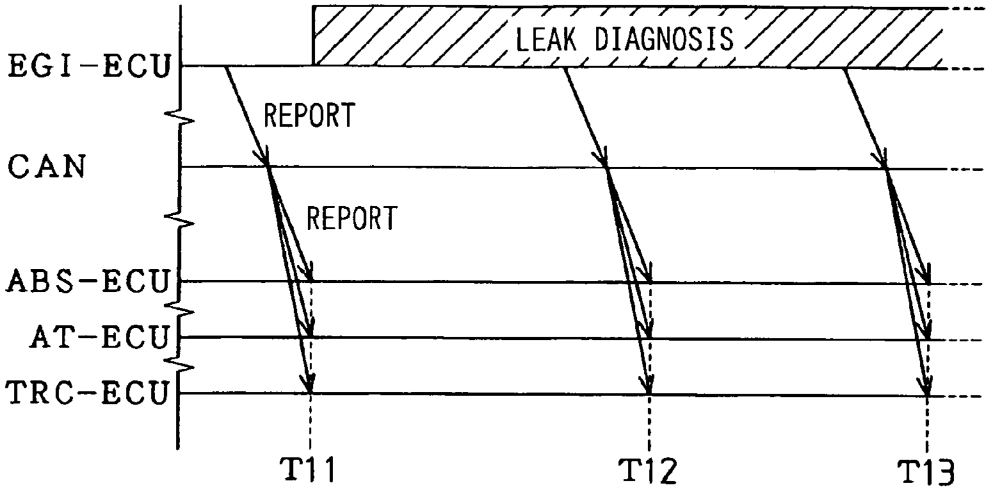
FIG. 10 shows a mode for performing communication (report) of the electronic control unit in accordance with the first embodiment with any other control unit.
Figure 11:
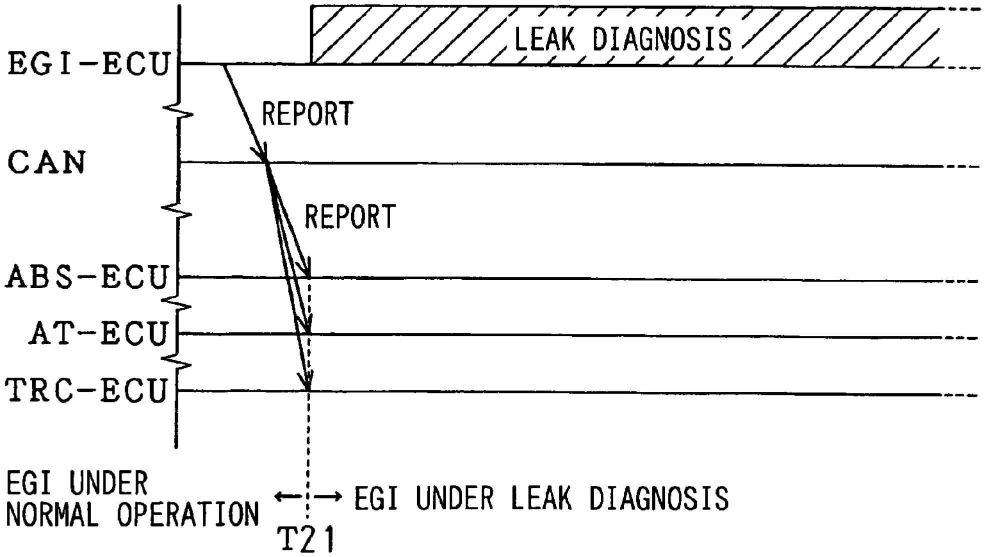
FIG. 11 shows a mode for performing communication of the electronic control unit in accordance with the first embodiment with any other control unit.

In the electronic control unit 10, the programs associated with the leakage diagnosis mode include a communication control program helping the electronic control unit 10 communicate information to other control units, which are connected to the electronic control unit 10 so that they can communicate with the electronic control unit 10, for example, the automatic transmission control unit 41, traction control unit 42, and antilock braking system control unit 43. At the start of leakage diagnosis, the communication control program is used to notify the control units of the fact that leakage diagnosis is in progress. Specifically, when control of diagnosis to be performed on the fuel vapor processing system is determined to be executed at step S6 shown in FIG. 5, the control units are notified of the fact. FIG. 10 and FIG. 11 are timing charts showing modes for performing reporting according to two methods that can be adopted as a notification method.

As for the report, there are, for example, a method of periodically performing a report as shown in FIG. 10 (timings T11 to T13), and a method of performing a report only once prior to start of leakage diagnosis (timing T21). At this time, data communication is, as mentioned previously, achieved in units of a packet (FIG. 2). FIG. 12A and FIG. 12B show examples of a data structure adapted to data to be transmitted to each of the control units.

For example, when the normal mode is changed to the leakage diagnosis mode in order to terminate diagnosis of the electronic control unit 10, data shown in FIG. 12A is transmitted. In this example, 700 (signifying a destination (control unit)) is specified as an ID in a header. 02 (signifying a data length) is specified as data DATA#1, 01 (signifying a processing item) is specified as data DATA#2, and 01 (set value for the processing item) is specified as data DATA#3. On the other hand, when the leakage diagnosis mode is changed to the normal mode in order to diagnose the electronic control unit 10, data shown in FIG. 12B is transmitted. In this example, 700 (signifying a destination (control unit)) is specified as an ID in the header. 02 (signifying a data length) is specified as data DATA#1, 01 (signifying a processing item) is specified as data DATA#2, and 01 (set value for the processing item) is specified as data DATA#3.

Through the foregoing communication, a value preventing an external device from operating abnormally or a value signifying that the electronic control unit 10 is stopped is transmitted. Consequently, erroneous detection or malfunction caused by an external device connected to the control unit can be avoided.

As described above, the electronic control unit 10 provides the following advantages.

(1) Among a plurality of programs stored compositely in the ROM 11*b*, that is, a plurality of functionally finely classified programs including programs used in common in both the normal mode and leakage diagnosis mode, programs required separately for the respective control modes are distinguished and associated with the control modes in advance. When either of the control modes is designated, the programs associated with the designated control mode are sequentially executed. Consequently, a mode designation program that is used conventionally need not be applied to the plurality of functionally finely classified programs. Accordingly, the program memory (ROM 11*b*) can save its storage capacity.

Moreover, once either of the control modes is designated, pieces of processing required for the designated control mode are sequentially executed. A load of arithmetic operations imposed on the electronic control unit 10 is largely reduced. Moreover, the plurality of functionally finely classified programs can be basically utilized as they are. This leads to reduction in a cost of development. Furthermore, since the load of arithmetic operations is reduced, power consumption is minimized. Consequently, energy saving is accomplished.

(2) Associating the plurality of different control modes, that is, the normal mode and leakage diagnosis mode with the plurality of programs can be easily achieved by referencing the reference table in which information on links of the control modes with programs required for the respective control modes is written (FIG. 4).

(3) Either of the control modes is designated by checking a history of manipulations performed on the ignition switch (start switch) 60 so as to determine why the electronic control unit 10 is started, for example, by checking whether the electronic control unit 10 is started responsively to the turning on of the ignition switch 60 or whether the electronic control unit 10 is automatically started based on the timer. Consequently, the sequential execution of programs associated with the designated control mode is achieved very smoothly. Moreover, the mode designation need be performed only once at the time of starting the electronic control unit 10. Thus, the load of arithmetic operations on the electronic control unit 10 is greatly reduced.

(4) Among the plurality of functionally finely classified programs, the control program for controlling driving of the sub-microcomputer (sub-controller) 12 that executes part of control of the operation of the vehicle-mounted engine, or more particularly, executes control of the electronically-controlled throttle valve is associated with the normal mode alone. Consequently, in the leakage diagnosis mode that is executed effect when the engine is stopped, control will not be executed by the sub-microcomputer 12. For example, it can be avoided that a condition of a load to be imposed at the time of starting the engine varies.

(5) The communication control program for communicating information to any other control unit over the communication line is associated with the leakage diagnosis mode. While processing associated with the leakage diagnosis mode is being performed, the communication control program is used to notify the other control unit of the fact that the processing associated with the leakage diagnosis mode is in progress. Consequently, when diagnosis is performed on the fuel vapor processing system with the engine stopped, erroneous detection or malfunction caused by other control unit (automatic transmission control unit 41) connected to the electronic control unit over the communication line can be avoided.

(6) Programs that are employed when the operation of the vehicle-mounted engine is controlled and that should preferably not be executed during diagnosis on the fuel vapor processing system (input control program PA4, diagnosis program PB2, communication control program PC2, external device control program PD4, internal IC control program PE1, and external device control program PD3) are associated with the normal mode alone. Moreover, programs for performing the diagnosis on the fuel vapor processing system (diagnosis program PB1 and external device control programs PD1 and PD2) are associated with the leakage diagnosis mode alone.

Consequently, a load of arithmetic operations on the electronic control unit 10 is reduced, and required control is appropriately executed according to the state of a vehicle. Specifically, for example, as far as diagnosis to be performed on a control system is concerned, since driving of unnecessary external devices is ceased, erroneous diagnosis is prevented. As for diagnosis to be performed on the fuel vapor processing system, since communication with the immobilizer control unit 28 that is required only at the time of starting the engine is ceased, occurrence of a drawback attributable to unestablished communication can be avoided.

Second Embodiment

An electronic control unit 10 according to the second embodiment is constructed similarly to the first embodiment shown in FIG. 1. However it is different in a sequence of processing performed when a control mode (either of the normal mode and leakage diagnosis mode) is designated. This processing is shown in FIG. 13 and executed in cooperation with programs stored in, for example, the ROM 11*b* (FIG. 1).

Figure 13:
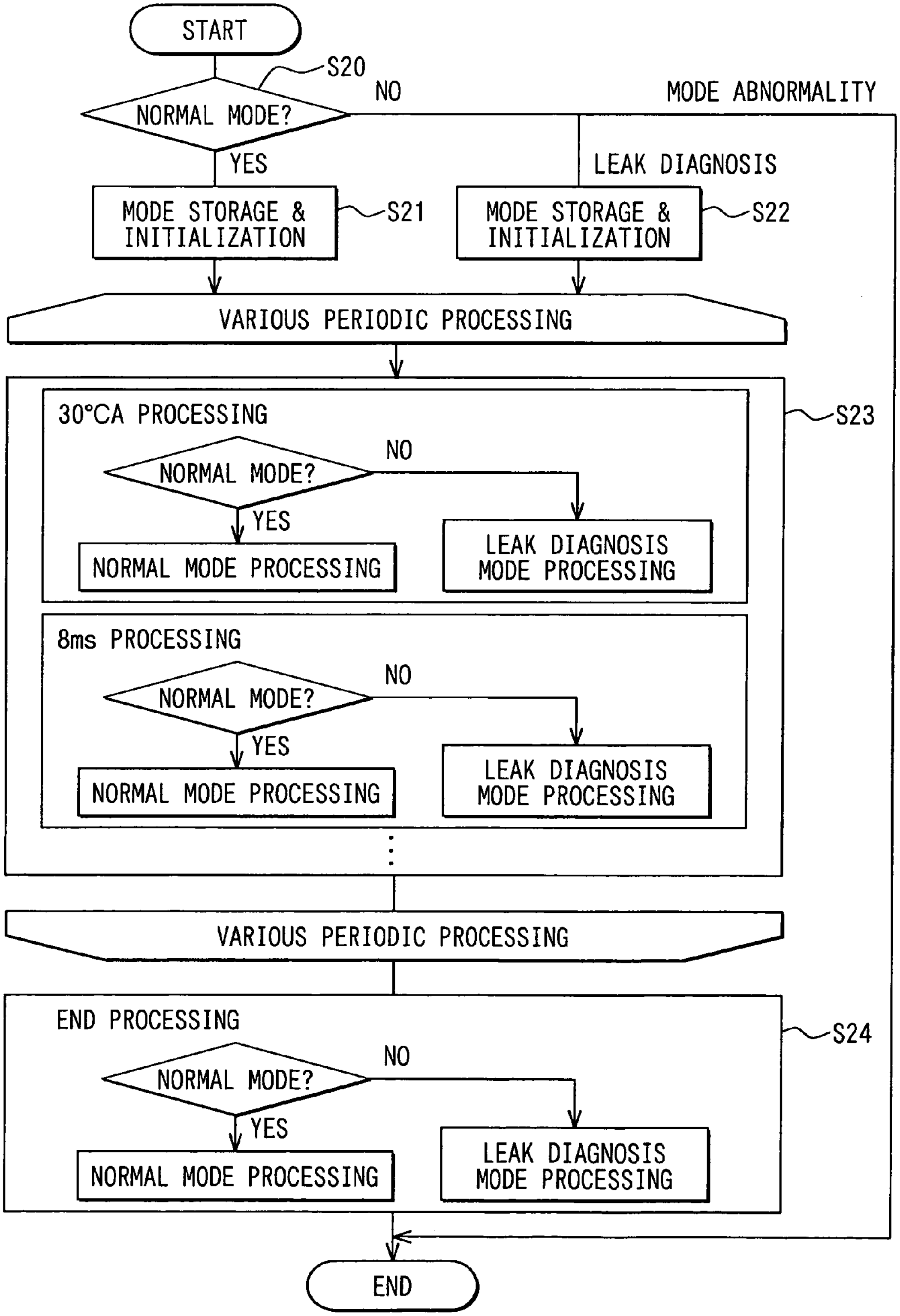
FIG. 13 shows a sequence of mode designation which an electronic control unit in accordance with the second embodiment of the present invention performed so as to designate either of a control mode for executing normal engine control and a control mode for performing diagnosis on a fuel vapor processing system.

As shown in FIG. 13, in the series of steps, first, at step S20, an operation mode is designated. Specifically, whether the current mode is a normal mode or leakage diagnosis mode, or whether the current mode is an abnormal mode other than the normal and leakage diagnosis modes is determined based on data latched at the input/output (I/O) port of the main microcomputer 11 or data held in a register included in the main microcomputer 11. Even in this case, the normal mode is a control mode for executing control of the operation of the vehicle-mounted engine, and the leakage diagnosis mode is a control mode for automatically performing diagnosis on the fuel vapor processing system after the operation of the engine is ceased.

After the current mode is determined as the normal mode or leakage diagnosis mode, the operation mode (normal mode or leakage diagnosis mode) is stored in an appropriate storage device (for example, the RAM 11*c*) at step S21 or step S22. Moreover, initialization is performed appropriately according to the current mode. On the other hand, when the current mode is determined as the abnormal mode at step S20, the series of steps is terminated.

When the current mode is determined as either of the normal mode and leakage diagnosis mode at step S21 or step S22, synchronization with one of a clock signal or a crankshaft angle (engine rotation angle) signal is performed in various manners. Specifically, the synchronization includes time synchronization in which synchronization is attained at intervals of, for example, 1 ms, 4 ms, 8 ms, 16 ms, 32 ms, 64 ms, 128 ms, or 256 ms, and angle synchronization in which synchronization is attained at intervals of, for example, 30° CA (crankshaft angle), 180° CA, or 360° CA.

Whichever of the cycles is adopted for the synchronizations, an operation mode is first designated. The designation of the operation mode is different from the one of step S20. The operation mode (or data representing the operation mode) stored in the storage device at step S21 or step S22 is checked in order to designate the operation mode. Namely, in practice, the designation of the operation mode (control mode) is not performed but the data stored in the storage device (result of designation) is merely checked. Therefore, the processing is terminated normally within one or two machine cycles.

At a succeeding step, programs (for example, various control programs listed in FIG. 4) associated in advance with the operation mode (normal mode or leakage diagnosis mode) are executed. Basically, similarly to the reference table shown in FIG. 4, programs required for the respective control modes (normal mode and leakage diagnosis mode) are distinguished and associated in advance with the respective control modes. However, the reference table is not employed, but different programs are associated with each of the cycles to be exhibited by the clock signal or crankshaft angle signal, and optimal control is executed in relation to each of the cycles of the signal (processing timing).

As mentioned above, normal engine control or control of diagnosis (leakage diagnosis) on the fuel vapor processing system is executed as shown in FIG. 6 or FIG. 7 through the synchronization. Thereafter, at step S24, the storage device is accessed in order to check the operation mode. Termination associated with the operation mode (normal mode or leakage diagnosis mode) is executed, whereby the series of steps is terminated.

In the second embodiment, similarly to the first embodiment, reporting operation shown in FIG. 10 or FIG. 11 is performed.

According to the second embodiment, in addition to the same advantages as the advantages (1) and (4)–(6) of the first embodiment or equivalents, the following additional advantages are provided.

(7) Designation of one of the plurality of different control modes, that is, the normal mode and leakage diagnosis mode is achieved at intervals of a predetermined time synchronously with one of the clock signal and crankshaft angle signal. Therefore, the same advantage as the advantage (2) or an equivalent is provided. Moreover, normally, many of various controls of a vehicle are executed synchronously with one of the clock signal and crankshaft angle (engine rotation angle) signal. Accordingly, required controls can be executed appropriately.

(8) Moreover, programs to be executed with either of the control modes designated are varied depending on any of cycles to be exhibited by the clock signal or crankshaft angle signal that is used to determine the timing of designating either of the control modes. Consequently, optimal controls can be executed relative to each cycle of the signal (processing timing).

(9) When designation of either of the control modes is repeated a plurality of times, the result of the first designation is stored in an appropriate storage device (step S21 and step S22 in FIG. 13). The result of the first designation stored in the storage device is used to achieve the succeeding designations (step S23 and step S24 in FIG. 13). Consequently, a load of arithmetic operations imposed on the electronic control unit is reduced. This feature will be effective when it is applied to a configuration in which the number of times by which any of control modes is designated is large, such as, the electronic control unit of the this embodiment (step S23 and step S24 in FIG. 13).

OTHER EMBODIMENTS

The above embodiments may be modified as described below.

In the first embodiment, the reference table (FIG. 4) is stored in a program memory (ROM 11*b*) in which programs employed in the normal mode or leakage diagnosis mode are stored. Alternatively, the reference table (call information table) may be stored in, for example, the EEPROM 14.

The reference table is not limited to the one shown in FIG. 4. Any table will be used as long as information (program call information) on links of the control modes with programs required for the respective control modes is written in the table.

In the second embodiment, both synchronization with the clock signal (time synchronization) and synchronization with the crankshaft angle signal (angle synchronization) are adopted. Alternatively, either of the synchronizations may be adopted.

Instead of the communications illustrated in FIG. 10 and FIG. 11, a communication control program for allowing the electronic control unit to communicate information to the other control units, which is included in the programs associated with the leakage diagnosis mode, may be used to inhibit communication with the other control units during processing associated with the leakage diagnosis mode.

Figure 14:
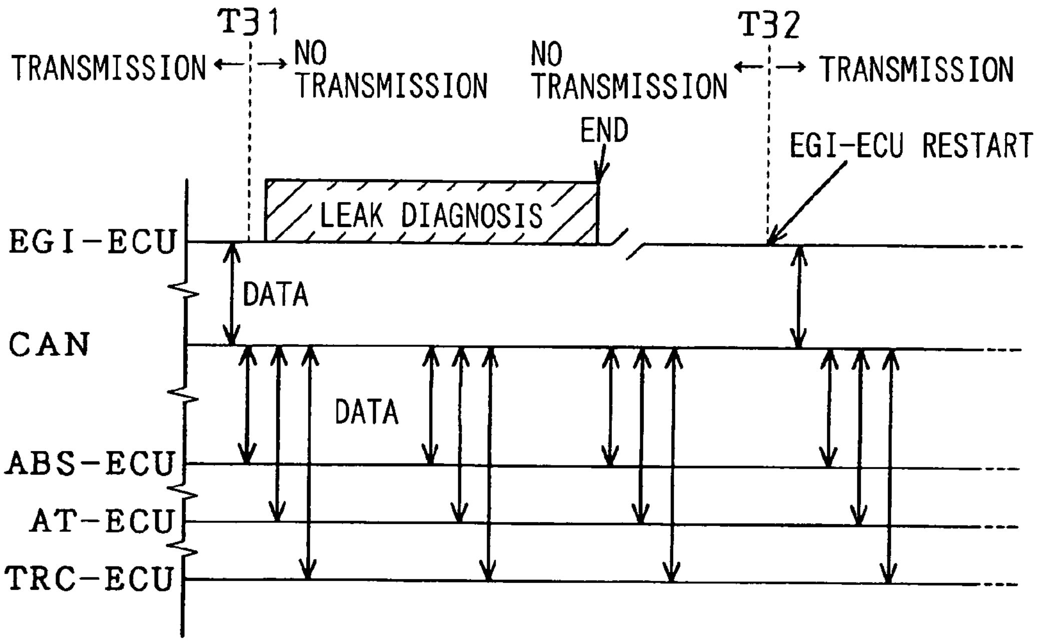
FIG. 14 shows a mode for performing no transmission so as to inhibit a variant of the electronic control unit in accordance with the first or second embodiment from communicating with any other control unit.

FIG. 14 is a timing chart indicating a mode for performing no transmission (communication inhibition). Namely, in this example, the no transmission is executed at a timing T31 immediately before leakage diagnosis is initiated. At a timing T32 at which power supply to the electronic control unit 10 is resumed after the leakage diagnosis is terminated, communication with the other control units is resumed. When this communication is adopted, erroneous detection or malfunction caused by any other control unit (automatic transmission control unit 41 or the like) connected to the electronic control unit 10 over the communication line can be avoided in a preferable manner.

Figure 15:
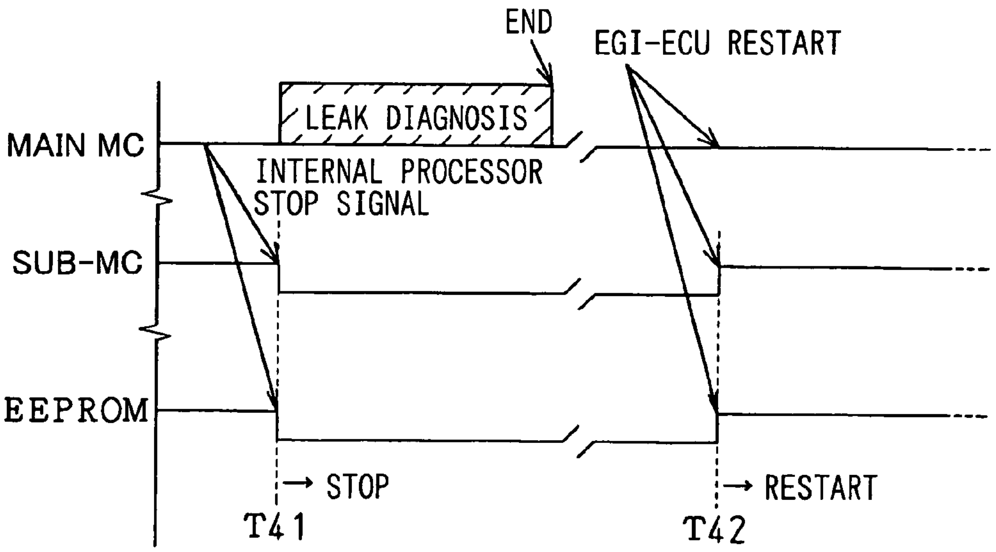
FIG. 15 shows a mode for performing forced stop on a microprocessor or an IC incorporated in a variant of the electronic control unit in accordance with the first or second embodiment.

At the time of initiating leakage diagnosis, driving of a microprocessor or an IC that is not related to the leakage diagnosis out of microprocessors including the CPU 12*a* (FIG. 1) and ICs (integrated circuits) including the input/output IC 13 (FIG. 1) and the EEPROM 14 (FIG. 1), which are incorporated in the electronic control unit 10, may be forcibly stopped. Namely, as illustrated in the timing chart of FIG. 15, for example, a signal with which the internal microprocessor or internal IC that has no relation with the leakage diagnosis is inactivated is transmitted at a timing T41 immediately before leakage diagnosis is initiated. Thus, driving of the internal microprocessor or internal IC may be forcibly stopped. Thereafter, the microprocessor or IC is restored to an operational state (activated) at a timing T42 at which power supply to the electronic control unit 10 is resumed after completion of the leakage diagnosis. Consequently, occurrence of a drawback during the diagnosis performed on the fuel vapor processing system with the engine stopped, for example, unnecessary driving of the electronically controlled throttle valve 26 (FIG. 1) can be appropriately avoided.

In the above embodiments, the timer 15 is used to start resuming power supply to the electronic control unit 10 for the purpose of performing the diagnosis on the fuel vapor processing system. However, for example, a decrease in the temperature of the engine (temperature of cooling water) occurring after a vehicle (engine) is stopped may be monitored in order to automatically start the electronic control unit 10. Aside from a timer, other devices and means may be used for automatically starting the electronic control unit 10.

In the above embodiments, the control mode (normal mode) for executing control of the operation of the vehicle-mounted engine and the control mode (leakage diagnosis mode) for automatically performing diagnosis on the fuel vapor processing system after the engine is stopped are referred to as a plurality of different control modes for the vehicle-mounted engine system. Alternatively, the present invention can be applied to a combination with any other control mode (diagnosis mode) that would prove effective when it is executed with a vehicle (engine) stopped.

What is claimed is:

1. A electronic control unit comprising:

a single program memory that stores a plurality of functionally finely classified programs, which includes programs to be used in common among a plurality of different control modes for a vehicle-mounted system; and a computer that performs processing associated with a designated control mode by selectively executing programs required for the control mode every time a control mode is designated, wherein the plurality of functionally finely classified programs stored in the program memory is associated with the plurality of different control modes by separating programs required for the respective control modes, wherein the computer sequentially executes only programs associated with the designated control mode, when any of the control modes is designated, and wherein the plurality of different control modes includes:

a first control mode for executing control of an operation of a vehicle-mounted engine, and a second control mode for automatically performing diagnosis on a fuel vapor processing system of the engine after the engine is stopped, wherein the computer designates any of the control modes by checking, based on a history of manipulations of a start switch, a cause of an operation start of the electronic control unit.

2. The electronic control unit according to claim 1, wherein the plurality of different control modes is associated with the plurality of programs in a reference table in which information on links of the control modes with required programs is written.

3. The electronic control unit according to claim 1, wherein:

programs associated with the second control mode include a communication control program for allowing the computer to communicate information with other control units over a communication line; and the communication control program is used to notify the other control units that processing associated with the second control mode is in progress while processing associated with the second control mode is being performed.

4. The electronic unit according to claim 1, wherein:

programs associated with the second control mode include a communication control program for allowing the computer unit to communicate information with other control units over a communication line; and the communication control program is used to inhibit communication with the other control units while processing associated with the second control mode is being performed.

5. The electronic control unit according to claim 1, wherein:

the plurality of functionally finely classified programs includes a control program for controlling an operation of another computer that executes part of control of the operation of the vehicle-mounted system; and the control program is associated with only the first control mode.

6. The electronic control unit according to claim 1, further comprising:

a sub-computer that executes part of control of the operation of the vehicle-mounted engine; and a means for forcibly stopping an operation of another computer while processing associated with the second control mode is in progress.

7. The electronic control unit according to claim 1, wherein:

programs associated with only the first control mode include at least one of a program for performing diagnosis on a control system, a program for performing processing relevant to control of an immobilizer, a program for performing processing relevant to control of fuel injection, a program for performing processing relevant to control of ignition and a program for performing processing relevant to control of an intake air quantity; and programs associated with only the second control mode include a program for performing diagnosis on the fuel vapor processing system.

8. An electronic control unit comprising:

a single program memory that stores a plurality of functionally finely classified programs, which includes programs to be used in common among a plurality of different control modes for a vehicle-mounted system; and a computer that performs processing associated with a designated control mode by selectively executing programs required for the control mode every time a control mode is designated, wherein the plurality of functionally finely classified programs stored in the program memory is associated with the plurality of different control modes by separating programs required for the respective control modes, wherein the computer sequentially executes only programs associated with the designated control mode, when any of the control modes is designated, and wherein the plurality of different control modes includes:

a first control mode for executing control of the operation of a vehicle-mounted engine; and a second control mode for automatically performing diagnosis on a fuel vapor processing system of the engine after the engine is stopped, wherein the computer designates any of the control modes periodically at an interval of one of a clock signal and a crankshaft angle signal.

9. The electronic control unit according to claim 8, wherein the programs to be executed with designation of any of the control modes are varied depending on the clock signal or the crankshaft angle signal.

10. The electronic control unit according to claim 8, wherein the computer stores a result of a first designation of the control modes and uses the stored result of the first designation for subsequent designations of the control modes, when designating any of the control modes a plurality of times.

11. The electronic control unit according to claim 8, wherein:

programs associated with the second control mode include a communication control program for allowing the computer to communicate information with other control units over a communication line; and the communication control program is used to notify the other control units that processing associated with the second control mode is in progress while processing associated with the second control mode is being performed.

12. The electronic control unit according to claim 8, wherein:

programs associated with the second control mode include a communication control program for allowing the computer unit to communicate information with other control units over a communication line; and the communication control program is used to inhibit communication with the other control units while processing associated with the second control mode is being performed.

13. The electronic control unit according to claim 8, wherein:

the plurality of functionally finely classified programs includes a control program for controlling an operation of another computer that executes part of control of the operation of the vehicle-mounted system; and the control program is associated with only the first control mode.

14. The electronic control unit according to claim 8, further comprising:

a sub-computer that executes part of control of the operation of the vehicle-mounted engine; and a means for forcibly stopping an operation of another computer while processing associated with the second control mode is in progress.

15. The electronic control unit according to claim 8, wherein:

programs associated with only the first control mode include at least one of a program for performing diagnosis on a control system, a program for performing processing relevant to control of an immobilizer, a program for performing processing relevant to control of fuel injection, a program for performing processing relevant to control of ignition and a program for performing processing relevant to control of an intake air quantity; and programs associated with only the second control mode include a program for performing a diagnosis on the fuel vapor processing system.

16. The electronic control unit according to claim 8 wherein the plurality of different control modes is associated with the plurality of programs in a reference table in which information on links of the control modes with required programs is written.

17. A method for electronic control, said method comprising:

storing a plurality of programs in a single program memory which includes programs to be used in common among a plurality of different control modes for a vehicle-mounted system; and performing processing associated with a designated control mode by selectively executing a computer program required for the control mode when a control mode is designated, wherein a subset of the plurality of programs stored in the program memory is associated with each of the respective control modes, wherein the computer sequentially executes programs associated with the designated control mode when a control mode is designated for execution, and wherein the plurality of different control modes includes:

a first control mode for executing control of an operation of a vehicle-mounted engine; and a second control mode for automatically performing diagnosis on a fuel vapor processing system of the engine after the engine is stopped, wherein the computer designates a control mode by checking, based on a history of start switch manipulations, a cause of a start operation of the electronic control unit.

18. A method as in claim 17 wherein the plurality of different control modes is associated with the plurality of programs in a reference table in which information on links of the control modes with required programs is written.

19. A method for electronic control, said method comprising:

storing a plurality of programs in a single program memory which includes programs to be used in common among a plurality of different control modes for a vehicle-mounted system; and performing processing associated with a designated control mode by selectively executing a computer program required for the designated control mode, wherein a subset of the plurality of programs stored in the program memory is associated with each respective control mode, wherein the computer sequentially executes only programs associated with the designated control mode, and wherein the plurality of different control modes includes:

a first control mode for executing control of the operation of a vehicle-mounted engine; and a second control mode for automatically performing diagnosis on a fuel vapor processing system of the engine after the engine is stopped, wherein the computer designates any of the control modes periodically at an interval of one of a clock signal and a crankshaft angle signal.

20. A method as in claim 19 wherein the programs to be executed with designation of any of the control modes are varied depending on the clock signal or the crankshaft angle signal.

21. A method as in claim 19 wherein the computer stores a result of a first designation of the control modes and uses the stored result of the first designation for subsequent designations of the control modes, when designating any of the control modes a plurality of times.

22. A method as in claim 19 wherein the plurality of different control modes is associated with the plurality of programs in a reference table in which information on links of the control modes with required programs is written.

* * * * *